March 3, 1970 — G. W. BROWN — 3,499,068
METHODS AND APPARATUS FOR MAKING CONTAINERS
Filed April 20, 1966 — 5 Sheets-Sheet 3

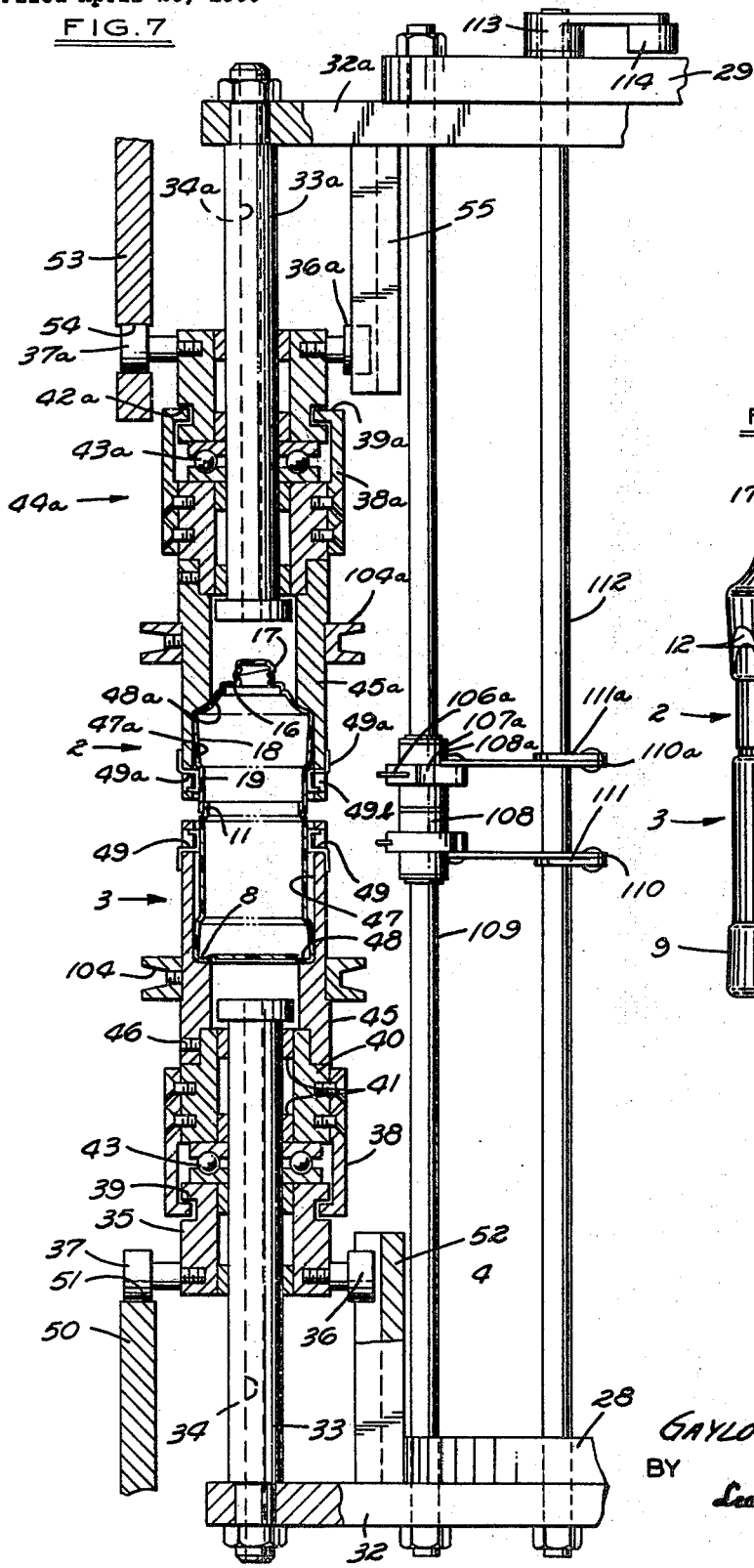

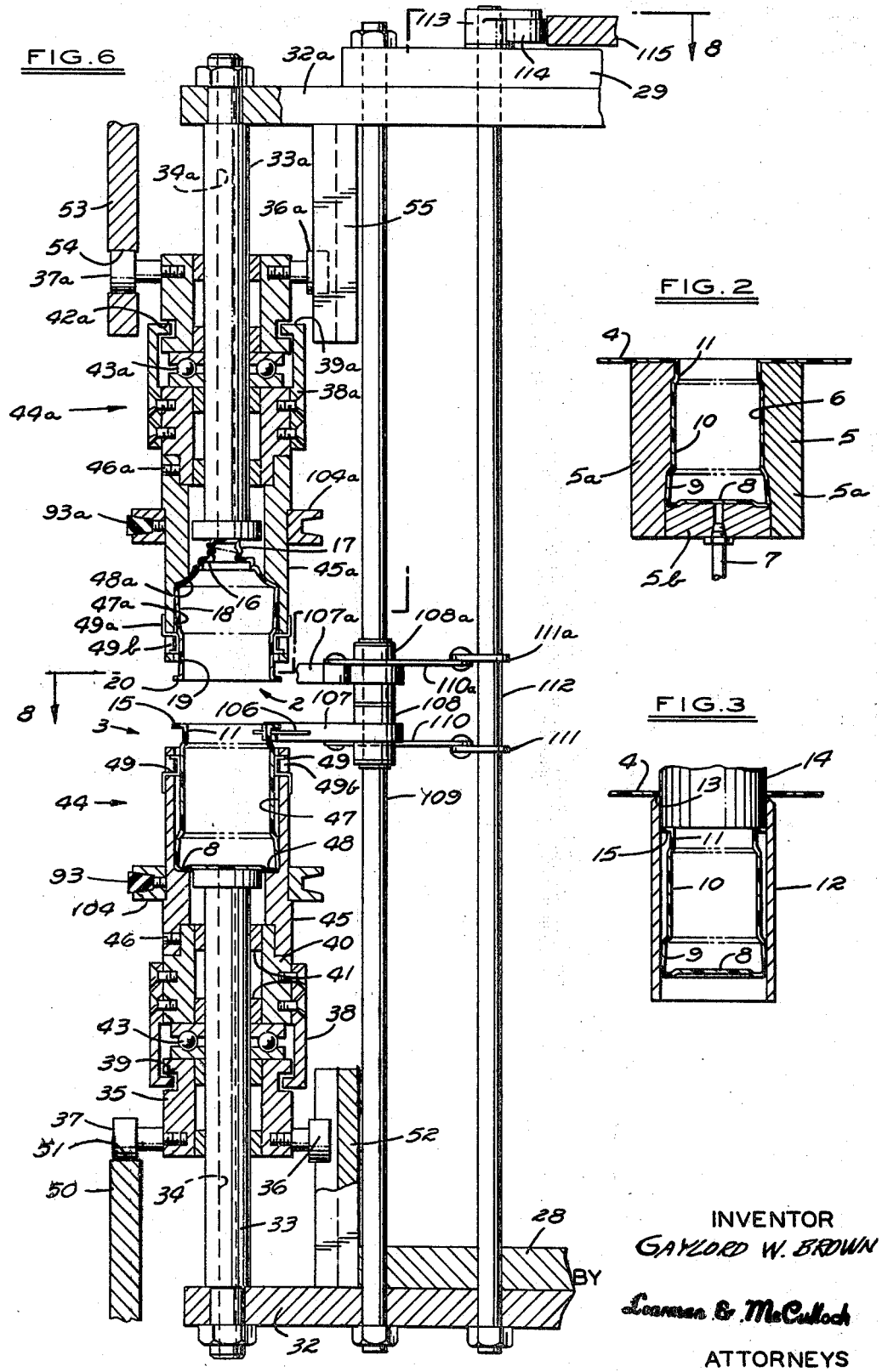

INVENTOR
GAYLORD W. BROWN
BY Learman & McCulloch
ATTORNEYS

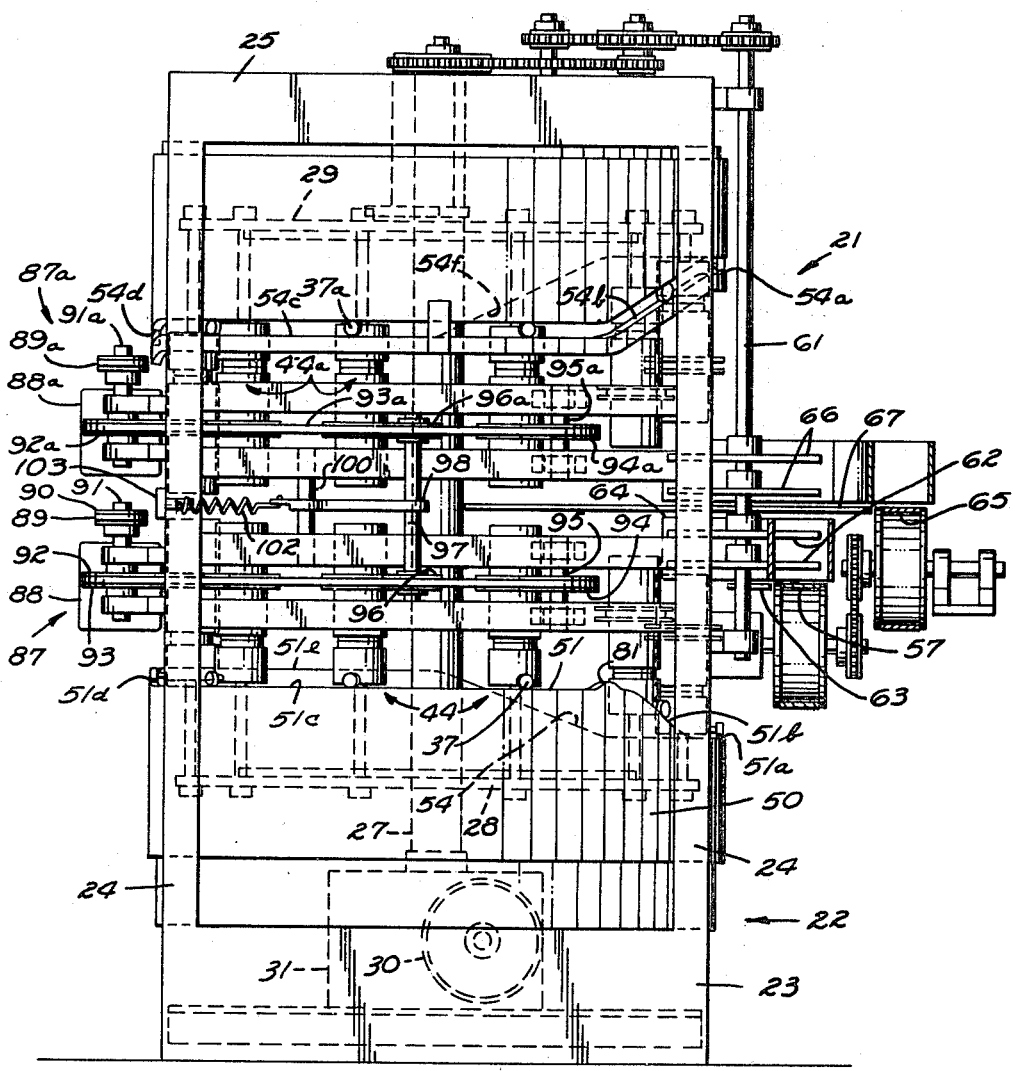

United States Patent Office 3,499,068
Patented Mar. 3, 1970

3,499,068
METHODS AND APPARATUS FOR MAKING CONTAINERS
Gaylord W. Brown, Beaverton, Mich., assignor to Brown Machine Company of Michigan, Inc., a corporation of Michigan
Filed Apr. 20, 1966, Ser. No. 543,846
Int. Cl. B29c 27/08
U.S. Cl. 264—68                                                    16 Claims

ABSTRACT OF THE DISCLOSURE

A method and apparatus for axially joining differential pressure formed, thermoplastic container sections with diametrally enlarged ends, and like hollow members, wherein the container sections are thermoformed and initially cut from the web in which they are thermoformed in a manner to leave a flange of a diameter corresponding to the diametral enlargement; wherein the severed container sections are then supported by holders in coaxial, spaced relation with the ends to be joined confronting one another; wherein a rotary driving force is applied at least to one of the container section supporting members to effect relative rotation of the container sections and the confronting end of at least one of the container section is trimmed of its flange during the application of the driving force to enable the container sections to be relatively telescoped with an interference fit; and wherein the container sections are relatively moved axially into telescoping relation during their relative rotation to generate heat by friction and weld the container sections together.

---

This invention relates to methods and apparatus for making organic plastic containers and more particularly to the making of containers of diverse shapes by friction welding together two container sections or members formed by differential pressure apparatus and in which the members to be joined together initially include peripheral flanges which must be removed prior to the joining of the members.

In the manufacture of plastic containers from thermoplastic materials such as polystyrene and polyethylene, it frequently is aesthetically desirable that the opposite end portions of a container have peripheral dimensions greater than the dimension of the intermediate wall. This construction is also desirable to decrease the possibility of the container's slipping from a person's hand during use. It has been thought that such containers must be produced in one piece by a blow molding method, but such containers can be more economically formed by joining together upper and lower container sections which are formed in partible molds in differential pressure froming apparatus. The problem is that such container sections have larger diameters at their closed ends and cannot be trimmed to the lesser diameter of the open end in conventional web cutout machines.

One aspect of the present invention resides in the concept of differential pressure froming the container halves and passing them through such machinery anyway, with the result that the trimming of a container half from the plastic web in which it is molded results in a radially extending peripheral flange at the open end of the container section which is then removed at the time the halves are joined together.

An object of this invention is to provide methods by which the advantages of differential pressure molding and friction welding of container members may be achieved regardless of the formation of peripheral flanges on such container members.

Another object of the invention is to provide methods of removing in transit peripheral flanges formed on such container members and without increasing the in transit time of the members.

A further object of the invention is to provide an improved method of friction welding container members formed of thermoplastic material.

Another object of the invention is to provide apparatus for making a container from two container portions formed by differential pressure molding processes and in which means is provided for trimming the container sections to enable them to be telescoped with an interference fit so as to be capable of being friction welded together.

A further object of the invention is to provide apparatus of the character referred to and having improved means for friction welding such container sections.

Other objects and advantages of the invention will be pointed out specifically or will become apparent from the following description when it is considered in conjunction with the appended claims and the accompanying drawings, in which:

FIGURE 1 is an elevational view of a typical container formed in accordance with the invention;

FIGURE 2 is a sectional, somewhat diagrammatic view illustrating the manner of and apparatus for differential pressure molding one container section from a plastic sheet;

FIGURE 3 is a view similar to FIGURE 2 and illustrating the manner of and apparatus for trimming the container member from the plastic sheet from which it has been molded;

FIGURE 5 is a side elevational view of the apparatus shown in FIGURE 4 as viewed from left to right;

FIGURE 6 is an enlarged, vertical sectional view of apparatus for supporting and trimming container members;

FIGURE 7 is a view similar to FIGURE 6, but illustrating the parts in the positions they occupy during friction welding of the container members;

Figure 4:
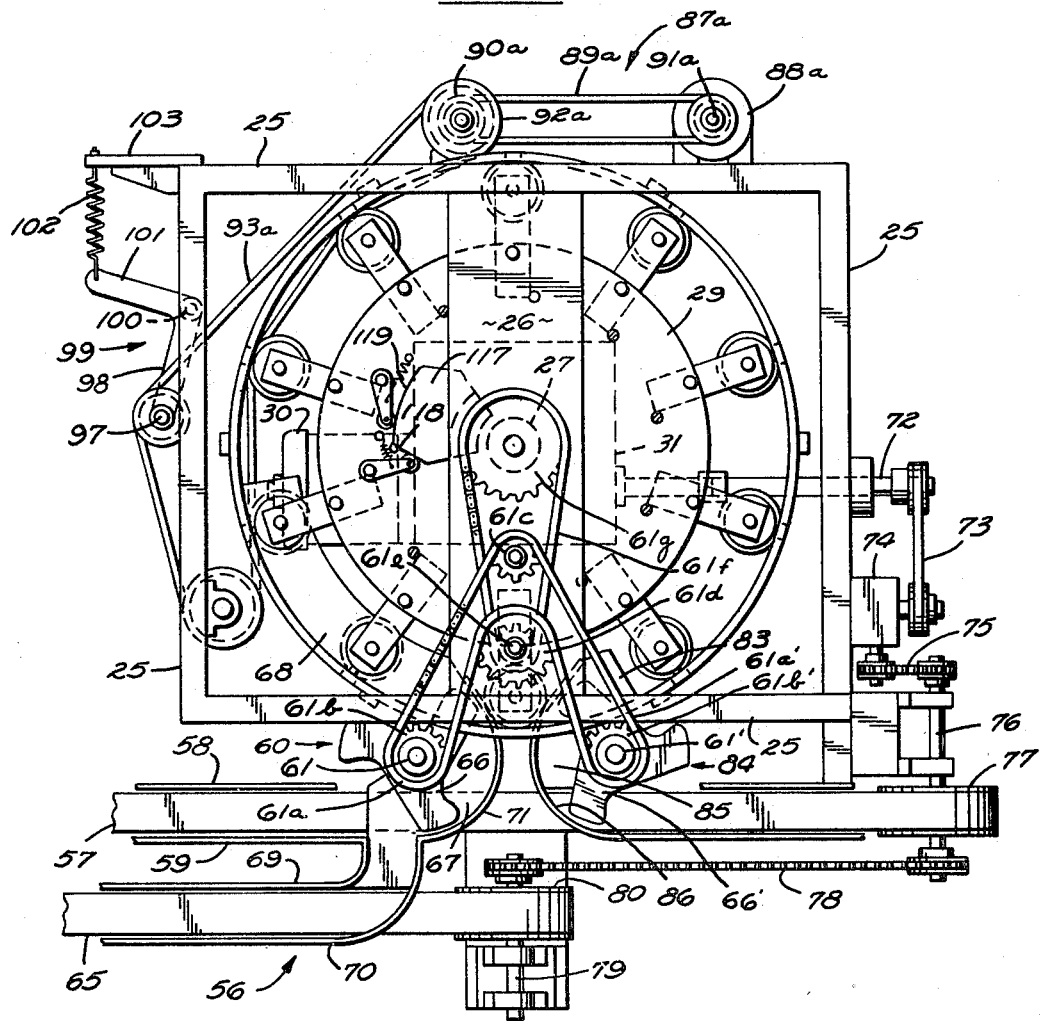
FIGURE 4 is a top plan view of apparatus for assembling and friction welding container sections and fragmentarily illustrating means for delivering container sections to the assembling apparatus and means for receiving assembled containers.

The principles underlying the present invention and the construction and operating characteristics of some of the apparatus to be described are disclosed in applicant's assignee's United States Patent No. 3,297,504, and to which reference may be had for a more detailed discussion of such principles and apparatus.

Apparatus constructed in accordance with the disclosed embodiment of the invention is adapted for use in the manufacture of hollow plastic containers 1 having upper and lower sections or members 2 and 3, respectively, joined to one another. The lower section 3 conveniently may be formed by a conventional differential pressure molding process in which a heated sheet 4 (see FIGURE 2) of thermoplastic material such as high impact polystyrene, polyethylene, polyvinylchloride, or the like, is positioned over a separable mold 5 of conventional construction having a cavity 6 therein of a size and shape corresponding to the shape of the member to be molded and in communication with which is a vacuum conduit 7. In its operation, the molding process produces a thin-walled body having a closed end 8, a side wall having an enlarged portion 9 adjacent the wall 8, an intermediate wall portion 10, and a reduced cylindrical wall portion 11 which is joined to the sheet 4 from which the body is molded.

Following the molding process, the sections 5a of the mold 5 are separated from the section 5b so as to permit the molded body to be removed from the mold. The molded body then is introduced to a cylindrical trimming member 12 having a knife edge 13 adjacent the sheet 4. Inasmuch as the diameter of the portion 9 is larger than the diameter of the neck 11, the neck 11 will be radially inward of the inner surface of the member 12. A reciprocable ram 14 may then be introduced to the member 12 so as to sever the molded body from the sheet 4 to produce the container member 3. The open end of the neck 11 will be surrounded by a peripheral flange 15.

The upper container portion 2 may be formed in exactly the same manner as the lower member and, as illustrated, has a closed end 16 provided with a threaded neck 17. Adjacent the wall 16 is an annular, radially enlarged wall portion 18 to which is joined a generally cylindrical wall portion 19 having an inside diameter of such size as to accommodate the portion 11 with an interference fit. Due to the enlarged wall portion 18, the trimming of the member 2 from the plastic sheet from which it is formed will result in a peripheral flange 20 (see FIGURE 6) at the open end of the wall portion 19 for the same reasons earlier explained in connection with the lower member 3. FIGURES 2 and 3 show typical molding and trimming apparatus. For production machinery of this general character I direct attention to the present applicant's assignee's United States Patent Nos. 3,217,576 and 3,297,504.

Apparatus for assembling and joining the container members 2 and 3 is designated generally by the reference character 21 and comprises a stationary frame 22 having a base 23, upstanding frame members 24 and upper horizontal frame members 25, two of which are spanned by a cross bar 26. Journaled at its opposite ends in the base 23 and in the cross bar 26 is a vertical shaft 27. Fixed on the shaft 27 for rotation therewith are lower and upper disks 28 and 29, respectively. The shaft 27, together with the disks 28 and 29, are driven by an electric motor 30 via a speed reduction unit 31 to which the shaft 27 is coupled by means of internal gearing (not shown).

Secured to and projecting radially from the disk 28 is a plurality of supporting arms 32 (see FIGURES 6 and 7) to the radially outer end of each of which is secured an upstanding support pedestal 33 which preferably is longitudinally bored as at 34 for connection to a source (not shown) of vacuum. Slidably mounted on the pedestal 33 is a sleeve 35 on which are mounted radially inner and radially outer guide rollers 36 and 37, respectively. An annular coupling 38 having a lower flange 39 is secured to a sleeve 40 which is journaled on the pedestal 33 by bearings 41. The flange 39 is rotatably accommodated in an annular groove 42 formed in the sleeve 35 so as to prevent axial separation of the members 35 and 40, but such members are relatively rotatable by means of a bearing assembly 43 interposed therebetween.

Means for supporting the container member 3 is indicated generally by the reference character 44 and comprises a tubular member 45 which is fixed to the sleeve 40 by suitable means such as a screw 46. The upper, inner surface of the member 45 has a configuration which conforms substantially to the configuration of the container member 3, but the height of the latter is such that the neck 11 and flange 15 project beyond the free end of the member 45. The tubular member 45 has a smooth, cylindrical bore 47 terminating between the ends of the member 45 in a radially inwardly projecting shoulder 48 against which the bottom wall 8 of the container member 3 may rest. The diameter of the bore 47 corresponds substantially to the diameter of the bottom wall 8, but the depth of the bore is such that, when the container member 3 is accommodated in the member 45, the neck 11 and the flange 15 project beyond the support member. Deformable springs 49 of any desired design extending through openings 49b in the member 45 center the member 3 within the support 45 and exert sufficient force on the container member to preclude its rotating relatively to the support 45. Prevention of relative rotation between the members 3 and 45 further may be assured by connection of the bore 34 to the vacuum source.

To the upper disk 29 is secured a plurality of radially projecting arms 32a similar to and corresponding in number and spacing to the arms 32. To each of the arms 32a is connected supported apparatus similar to that just described, and similar parts are identified by similar reference characters. The bore 47a in the support member 45a, however, is so shaped as to enable the container member 2 to be supported therein coaxially with the member 3 and with a portion of the wall 19 and the flange 20 projecting beyond the member 45a.

Supported on the machine frame is a generally cylindrical cam 50 having a contoured surface 51 on which each of the guide rollers 37 rests. The cam surface 31 rises and falls vertically, as will be pointed out more fully hereinafter, so as to effect vertical displacement of each supporting member 44 in response to rotation of the shaft 27. The supports 44 are guided in their vertical movements by guide members 52 supported on the arms 32 and which accommodate the rollers 36.

The machine frame also supports a stationary upper cam 53 having a contoured groove 54 therein which accommodates each of the guide rollers 37a. The groove 54 rises and falls vertically so as to effect vertical movements of the support member 44a in response to rotation of the shaft 27. The members 44a are guided in their vertical movements by guides 55 secured to the arms 32a and which accommodate the guide rollers 36a.

Means designated generally by the reference character 56 is provided for delivering the container sections to the assembling apparatus and comprises an endless conveyor belt 57 extending between guide rails 58 and 59 for delivering the container members 3 to a loading station 60. At the loading station is a rotatable shaft 61 journaled on the main frame and on which is fixed a pair of star wheels 62 the blades of which are adapted to sweep successive container members 3 off the belt 57 onto a shelf 63 from which the members 3 drop into the support tubes 45. The shaft 61 is rotated by a chain 61a trained around a sprocket 61b fixed to the shaft 61 and around an idler sprocket 61c journaled on a shaft on the cross bar 26. The chain 61a is driven by a sprocket 61d on a shaft 61e which in turn is driven by a chain 61f trained around a sprocket 61g fixed to the shaft 27. A shaft 61' is similarly rotated by chain 61a trained around a sprocket 61b' and around the idler sprocket 61c on the shaft on cross bar 26 to drive a discharge star wheel 66'. The members 3 are guided in their movement from the belt 57 to the support member 45 by a curved guide rail 64.

The delivery means 56 also includes a second endless conveyor belt 65 which is located at a higher level than the belt 57 and which delivers container sections 2 to the loading station 60. A pair of star wheels 66 are fixed on and rotate with the shaft 61 and sweep successive container members 2 from a shelf 67 onto an arcuate shelf extension 68 in a position to be received in a support member 45a. The members 2 are guided in their passage from the belt 65 to the shelf extension 68 by rails 69, 70, and 71.

The conveyor belts 57 and 65 are driven from the speed reducer 31 by means of an output shaft 72 that is connected by means of a belt 73 to a gear transmission unit 74 which, in turn, is connected by a sprocket chain 75 to a shaft 76 that is keyed to a pulley 77 around which the belt 57 is trained. The shaft 76 also is connected by a chain 78 to a shaft 79 that is keyed to a pulley 80 around which the belt 65 is trained.

The construction and arrangement of the parts thus far described are such that successive container members 2 and 3 are delivered to the loading station 60 in vertically spaced relation and are discharged from the loading station in timed relation to the rotation of the disks 28 and 29 and their respective support members 44 and 44a.

Figure 9:
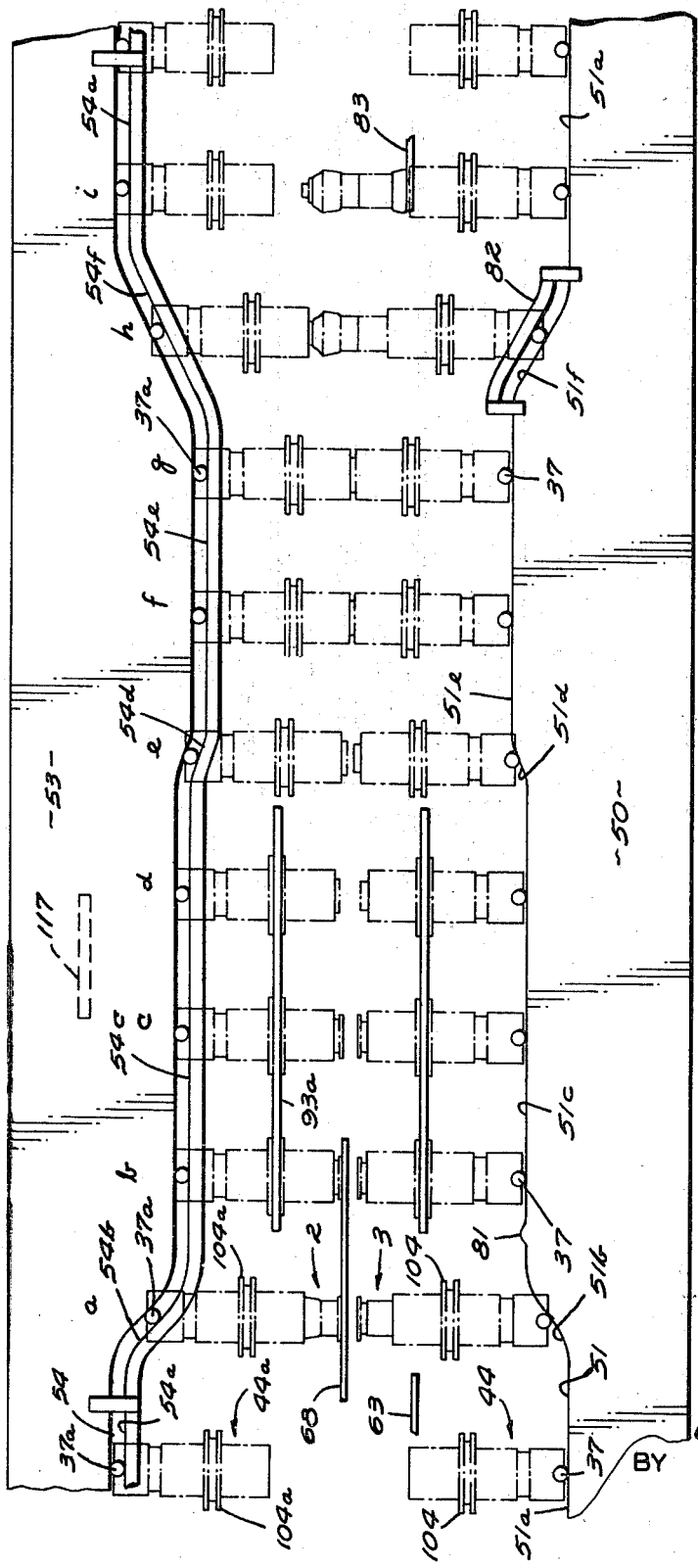
FIGURE 9 is an enlarged, elevational schematic view indicating the functions performed by the assembling and friction welding apparatus.

FIGURE 9 illustrates 360° rotation of the disks 28 and 29 and also illustrates the successive positions of one support 44 and one support 44a during one complete cycle. At the left hand end of FIGURE 9, the supports 44 and 44a are in their maximum vertically spaced apart positions, the guide roller 37 resting on a horizontal dwell surface 51a of the cam surface 51 and the guide roller 37a being accommodated in a horizontal dwell surface 54a of the cam groove 54. As the supports 44, 44a move to the right toward the position a, the support 44 will pass adjacent the shelf 63 and a container member 3 will be discharged from the shelf into the support. As the supports 44, 44a move to the right toward a position a, the roller 37 will climb an upwardly inclined cam surface 51b so as to elevate the support 44. Simultaneously, the roller 37a will ride down a downwardly inclined cam surface 54b so as to lower the support 44a. As the support 44a moves downwardly, it will receive a container member 2 resting on the shelf extension 68, whereupon the container member will be seated in the tubular member 45a an moved along the shelf 68.

The inclined cam surfaces 51b and 54b merge with horizontal dwell surfaces 51c and 54c, respectively. Between the cam surfaces 51b and 51c is an upstanding lobe 81 which lies in the path of the roller 37 so as to jog the support 44 vertically and seat the container member 3 in the support 44. The seating may be assisted by the application of suction via the bore 34. By the time the supports 44, 44a have reached station b, the respective container members 3 and 2 will be completely seated in the respective supports 44, 44a.

The supports 44, 44a move successively from station b through stations c and d to station e and container members supported thereby are maintained in coaxial, vertically spaced relation. At the station e, the cam surface 51 is upwardly inclined as at 51d and the came groove 54 is downwardly inclined as at 54d so as to effect movement of the supports 44, 44a toward one another. The cam surfaces 51d and 54d merge with dwell surfaces 51e and 54e, respectively, at which point the containers are being friction welded, as will later appear, and through the stations f and g, the supports 44, 44a are maintained in close, end-to-end relation.

From the station g, the cam surface 51 is inclined downwardly as at 51f and the cam groove 54 is inclined upwardly as at 54f so as to effect axial separation of the members 44, 44a as they progress to the stations h and i. To assure downward movement of the support 44, a rail 82 overlies the cam surface 51f and in the path of movement of the guide roller 37. The cam surfaces 51f and 54f merge with the cam surfaces 51a and 54a, respectively, so that by the time the supports are at station i they again are at the positions they occupied originally.

Adjacent the station i is a shelf 83 which leads to a discharge station 84 for assembled containers 1, the shelf 83 including an extension 85 which leads to the conveyor belt 57. Containers deposited on the shelf 83 are delivered to the belt 57 by a guide rail 86.

During the travel of each support 44, 44a through a cycle, it is essential that rotation be imparted to each of the support members 45, 45a so as to effect rotation of the container members supported thereby. Driving means for the support 44 is indicated generally by the reference character 87 (see FIGURE 5) and comprises an electric motor 88 connected by a belt 89 to a pulley 90 which is mounted fast on a shaft 91. Also fixed to the shaft 91 is a pulley 92 around which is trained an endless drive belt 93. The belt 93 also is trained around a pulley 94 that is mounted on a shaft 95 journaled on the machine frame. The drive belt 93 is engaged by a pulley 96 that is journaled on a shaft 97 which is fixed to one arm 98 of a bell crank 99 that is pivoted to the frame by means of a pin 100. The bell crank has another arm 101 to which is connected one end of a tension spring 102, the other end of which is anchored to a bracket 103 fixed on the frame.

Driving apparatus for rotating the supports 44a is designated generally by the reference character 87a and is similar to the apparatus just described. Parts of the apparatus 87a which are similar to the parts of the apparatus 87 are identified by the same reference character, followed by the suffix a. It should be observed, however, that the shaft 97 and the tensioning members 98–103 are common to both driving mechanisms 87 and 87a.

The rotary driving aparatus for the members 44 also includes a pulley 104 fixed to each support sleeve 45. A similar pulley 104a is fixed to each support sleeve 45a.

The motors 88 and 88a preferably operate continuously so as to drive their respective belts 93, 93a at all times, but the direction of rotation of the respective motors is opposite.

The construction and arrangement of the driving mechanisms 87, 87a are such that, when the respective supports 44, 44a are at the stations b, c and d, the pulleys 104, 104a are at the level of and are engaged by the respective belts 93, 93a so as to impart simultaneous rotation to the supports 44, 44a, but in opposite directions. As the members 44, 44a leave the station d and approach station e, however, the pulleys 104, 104a disengage the respective belts 93, 93a, whereupon the driving mechanisms are disabled from imparting further rotation to the respective supports. Each support, however, is freely rotatable and, therefore, continues to rotate or coast.

As has been pointed out hereinbefore, the differential pressure molding process by which the container members 2 and 3 are formed with radially enlarged, closed end portions 9 and 18 results in the formation of flanges 15 and 20 on the respective container members. For the two container members to be telescoped, the flange on at least one member, and preferably the flanges on both members, must be removed. Accordingly, trimming apparatus designated generally by the reference characters 105 and 105a is provided to trim the flanges from the container members.

Figure 8:
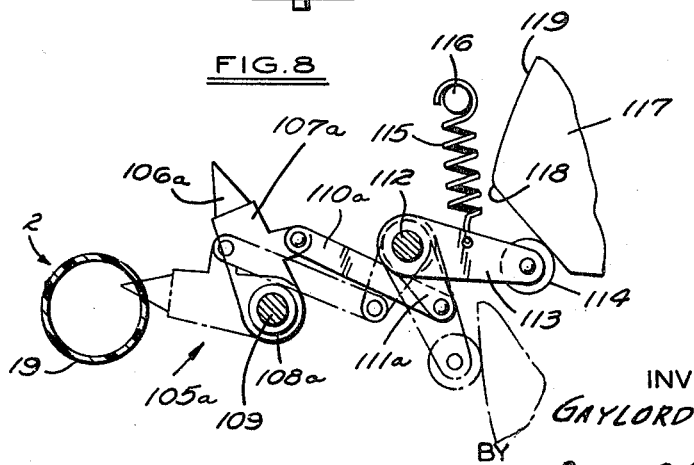
FIGURE 8 is an enlarged, fragmentary plan view illustrating the mechanism for moving the flange trimming knives into operative position.

The trimming apparatus 105a is best illustrated in FIGURE 8 and comprises a blade 106a supported in a holder 107a that is journaled by a bushing 108a on a rod 109 that is secured to and spans the disks 28 and 29. To the holder 107a is pivoted one end of a link 110a, the opposite end of which is pivoted to a crank arm 111a that is fixed to a shaft 112 which is journaled in and spans the disks 28 and 29. Parts of the apparatus 105 which are similar to the apparatus 105a are identified by similar reference characters, but omitting the suffix a.

Means for operating the trimming apparatus 105, 105a comprises an operating lever 113 one end of which is fixed to the shaft 112 and the other end of which journals a guide roller 114. The operating lever 113 normally is maintained in the position shown in full lines in FIGURE 8 by means of a spring 115, one end of which is anchored to the lever 113 and the opposite end of which is anchored to a pin 116 which is fixed to the disk 29. In the normal position of the lever 113, the holders 107, 107a and their knives 106, 106a, are spaced from the respective container members as is indicated in full lines in FIGURE 8.

Means for actuating the trimming devices at each work station 38–38a to sever the flanges 15 and 20 from the respective container members comprises a stationary cam 117 mounted on the cross bar 26 and having a rise surface 118 located in the path of movement of the lever 113. Engagement between the cam surface 118 and the roller 114 rocks the shaft 112 clockwise, as viewed in FIGURES 4 and 8, so as to enable the knives 106, 106a to engage the wall portions 11 and 19 of the respective container members 3 and 2 and cut through those wall portions. The cam surface 118 merges with a dwell surface 119 which maintains the knives projected as the supports 44, 44a move from station c to station d. During such movement of the support members, they and the container members supported thereby are rotated under the influence of the drive belts 93, 93a so as to effect complete trimming of the flanges 15 and 20. Once the roller 114 has traversed the dwell surface 119, the spring 115 is able to restore the knives to their retracted positions. Air jets (not shown) or any other suitable means may be utilized to eject the severed flanges.

It will be understood that trimming devices 105 and 105a are associated with each of the supports 44 and 44a. For clarity, however, the drawings do not show each trimming device.

Following the severing of the flanges from the respective container members, the remaining portion of the wall 11 of the container 3 may be inserted in the wall portion 19 of the container member 2. This is accomplished as the support members move from station e toward station f and following disengagement of the driving belts from the respective supports.

As has been pointed out hereinbefore, the portion 11 of the container member 3 is adapted to be received within the wall portion 19 of the container member 2 with an interference fit. Thus, the confronting surfaces of the telescoped container sections will be engagement with one another. Inasmuch as the containers are rotating in opposite directions when they are telescoped, the engagement between their confronting surfaces will generate heat which will result in a bonding or welding of the container sections together at a time when the pulleys 104 and 104a have moved beyond belts 93 and 93a and are spinning freely, as described in copending application Ser. No. 264,809, now U.S. Patent No. 3,297,504.

In the practice of the herein disclosed methods and the use of the apparatus, the container members 2 and 3 are molded in the manner previously referred to and are introduced to the delivery conveyors 65 and 57, respectively, for delivery to the loading station 6. Introduction of the container sections to their respective supports is effected by operation of the star wheels 62 and 66 in timed relation to the revolution of the shaft 27 so that successive bottom members 3 are discharged to successive supports 44, and successive upper members 2 are discharged to successive supports 44a. Following reception of the container members in their respective supports, the latter are coupled to the drive belts so as to impart rotation in opposite directions to the supports and to the containers supported thereby. Owing to the opposite rotation of the support members, the relative speed of rotation will be the sum of the speeds of rotation of the two container members. If, therefore, it is desired that the container members have a relative speed of rotation of 2000 r.p.m., it is sufficient to rotate each container at the rate of 1000 r.p.m., but in opposite directions. The same principle applies if other relative speeds of rotation are desired.

During the driving of the support members, the flanges 20 and 15 of the respective container members 2 and 3 are trimmed and discarded. The trimming operation, therefore, is accomplished during the normal in transit time of the container members in the assembling apparatus. Following the trimming operation, the driving means is disengaged from each of the supports, but because of the ability of the latter to rotate freely, they will continue to spin at substantially the speed of rotation imparted by the driving means.

Following the disabling of the driving means, the respective supports are moved axially toward one another so as to effect telescoping of the container members. Due to the interference fit of the telescoped sections of the container members, the relative rotation of the container members will generate heat by friction. The interference fit between the container members, with the resultant resistance to relative rotation thereof, will exert a braking force on the container supports. The initial relative speed of rotation of the containers, however, should be such that the confronting surfaces of the container members quickly become heated to a temperature such that the outer surface of the material of which the container members is formed becomes partially molten, whereupon the two container members will be fused or welded together. At this time, relative rotation of the support members will cease.

Following the welding of the container members, the support members 44, 44a are moved away from one another, and the members 33, 33a progressively remove them from the sleeves 45, 45a, the springs 49, 49a being deflected outwardly through the openings 45b. The supports 44, 44a continue to be moved away from one another until the container has been elevated a distance sufficient to enable it to be deposited on the discharge shelf 83. At this point a similar star wheel 66a moves the container to the front end of conveyor 57 which serves as a discharge conveyor.

What is claimed is:

1. A method for making thermoplastic containers and like articles from hollow sections, including sections having diametrically enlarged portions axially inward of open ends, comprising: thermoforming the hollow sections in plastic web material; cutting said sections from the web material and leaving flange portions at least substantially as large as said enlarged portion; supporting a pair of container sections, including at least one with a flange portion, in coaxial spaced relation with open ends to be joined in confronting relation; removing the flange portion by radially penetrating said one container inward of said flange to permit relative telescoping of said sections; and moving the sections axially together and joining them.

2. The method defined in claim 1 wherein a rotary drive is applied to said container section with the flange portion to provide relative rotation of said pair of sections prior to said removing step and wherein removing is accomplished by rotating the container section with the flange portion about a cutting edge.

3. The method defined in claim 2 wherein said container section continues to be rotated after said flange portion is removed and the open ends of said pair of container sections are telescoped with an interference fit to friction weld them together.

4. A method of making a hollow container, having an enlarged portion located endwise relative to a more intermediate portion, from thermoplastic material comprising: differential pressure forming generally cylindrical members and trimming at least one of them so that its open end terminates in a peripheral flange; supporting said members in axially spaced relation with their said open ends confronting one another; applying a rotary driving force to the member having the flange to effect relative rotation of said members; bringing a cutting tool radially into engagement with said one of said members inward of the flange to penetrate said member during the application of said driving force to remove said flange and enable said one of said members to be telescoped within the other of said members with an interference fit; and axially moving said members into telescoping relation following the removal of said flange and while said members are relatively rotating to generate heat and weld said members to each other.

5. The method set forth in claim 4 including discontinuing the application of said driving force following the removal of said flange.

6. The method set forth in claim 4 including imparting a rotary driving force to the other of said members to rotate the latter in a direction opposite to the direction of said one of said members.

7. The method set forth in claim 6 including trimming a flange from said other of said members during the application of said driving force thereto to remove said flange.

8. The method set forth in claim 7 including discontinuing the application of said driving force to said other of said members following the removal of the flange thereon.

9. Apparatus for joining two container sections, one of said sections including a flange, comprising: carrier assembly means including means for supporting each of said sections in axially spaced, end-to-end relation and trimming means, movable toward and away from the supporting means to engage a container section thereon, for removing said flange of said one section by radially penetrating said one section inwardly of said flange to enable said sections to be relatively telescoped; means for moving said carrier assembly means in a predetermined path; means for relatively revolving the supporting means and trimming means; means, operable in timed relation with said trimming means, and when said trimming means is moved away from said supporting means and the container section thereon, for relatively moving said supporting means toward one another to effect relative telescoping and juncture of said sections; said trimming means comprising knife means mounted laterally opposite at least one of said supporting means for movement laterally from a remote position in a path toward said supporting means to engage said one container section thereon inward of said flange; said means for relatively revolving the supporting means and trimming means comprising means for driving the supporting means to rotate the container section relative to the knife means; said carrier assembly means being mounted for movement between container loading and unloading stations; and operating means being disposed in the path of said carrier assembly means and responsive to a predetermined movement of said carrier assembly means in said path to move said knife means toward said supporting means to engage a container thereon at a time when said drive means is rotating the supporting means.

10. Apparatus for joining two container sections, one of said sections including a flange, comprising: means for supporting each of said sections in axially spaced, end-to-end relation; trimming means, movable toward and away from the supporting means to engage a container section thereon, for removing said flange of said one section by radially penetrating said one section inwardly of said flange to enable said sections to be relatively telescoped; means for relatively revolving the supporting means and trimming means; means, operable in timed relation with said trimming means, and when said trimming means is moved away from said supporting means and the container section thereon, for relatively moving said supporting means toward one another to effect relative telescoping and juncture of said sections; said means for supporting said container sections in axially spaced relation including a pair of vertically spaced holders mounted for normally continuous orbital movement as a pair past container section loading and unloading stations, stationary cam means about which said holders orbit and follower means for at least one of the holders engaging the cam means for moving the one holder axially toward and away from the other holder; and said means for relatively revolving the supporting means and trimming means comprises drive means in the path of one of said holders engaged by that holder and producing rotary movement of the holder.

11. The combination defined in claim 10 in which said trimming means comprises a knife traveling said orbital path with the holders; means mounts said knife for lateral pivotal movement at a level on which it will engage a flanged container section carried by a holder which is revolved just axially inward of the container section flange at the time the holder is moving orbitally past said drive means and is being revolved; cam follower means is provided for said knife; and stationary cam means is mounted in the path of the knife follower means, to be engaged thereby as the holder and knife orbit and move said knife toward the revolving holder to engage the container section and sever the flange.

12. Apparatus for making a hollow container having an enlarged portion located endwise relative to a more intermediate portion, from thermoplastic material comprising: means for differential pressure forming generally cylindrical members in a plastic web; means receiving said members from said differential pressure forming means for trimming one of said members from the web so that its open end terminates in a peripheral flange; means receiving said members from said trimming means for supporting said members in axially spaced relation with their said open ends confronting one another; means for applying a rotary driving force to said one of said members in said support means to effect relative rotation of said members; means for bringing a cutting tool radially into engagement with said one of said members inward of the flange to penetrate said member during the application of said driving force to remove said flange and enable said one of said members to be telescoped with the other of said members with an interference fit; and means for axially moving said members into telescoping relation following the removal of said flange and while said members are relatively rotating to generate heat and weld said members to each other.

13. Apparatus as set forth in claim 12 including means for preventing rotation of at least one of said sections relative to its supporting means.

14. The combination defined in claim 12 in which said means for applying a rotary driving force to said one of said members comprises disengageable drive means for rotating the supporting means and imparting a rotation achieving a friction weld when the sections are telescoped with an interference fit.

15. The apparatus set forth in claim 12 wherein said means for supporting comprises means for supporting each of said members in axially spaced, end-to-end relation; said means for applying a rotary driving force rotates each of said supporting means, but in opposite directions.

16. The apparatus set forth in claim 12 wherein said trimming means comprises a plunging knife; and means mounts said knife for movement into and out of a position in which it engages said one of said members inwardly of said flange.

References Cited

UNITED STATES PATENTS

| 1,986,587 | 1/1935 | Ludington | 82—86 X |
| 2,701,719 | 2/1955 | DiPerro | 156—73 |
| 2,956,611 | 10/1960 | Jendrisak | 156—73 |
| 3,276,616 | 10/1966 | Lurie | 156—73 |
| 3,297,504 | 1/1967 | Brown et al. | 156—73 |
| 3,269,002 | 8/1966 | Hollander et al. | 29—470.3 |

ROBERT F. WHITE, Primary Examiner

N. RUSHEFSKY, Assistant Examiner

U.S. Cl. X.R.

18—5; 29—470.3; 156—73; 264—163